J. DENEAL.
STAY BOLT FOR BOILERS.
APPLICATION FILED FEB. 4, 1907.
910,361.
Patented Jan. 19, 1909.
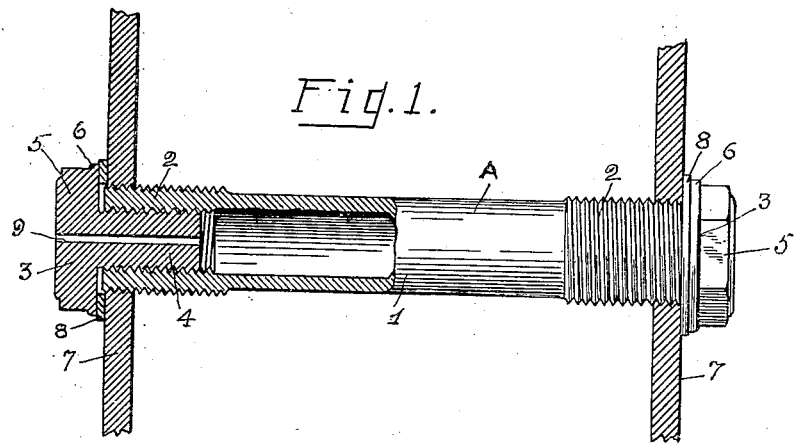
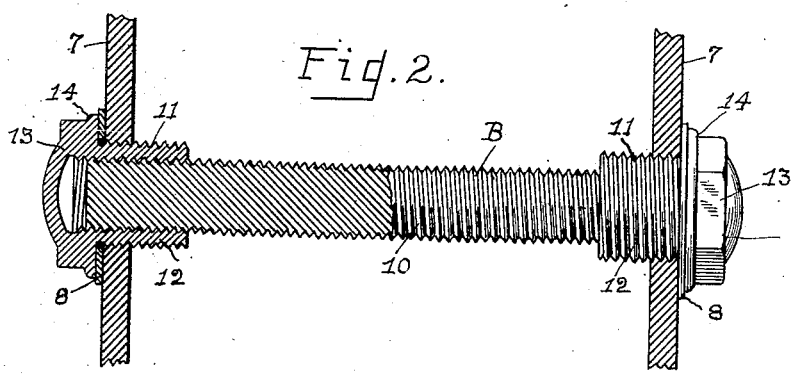
WITNESSES:
D. C. Walter
J. M. Barringer
INVENTOR.
Jackson Deneal
by Robt. B. Wilson
Attorney

UNITED STATES PATENT OFFICE.

JACKSON DENEAL, OF TOLEDO, OHIO, ASSIGNOR TO JOHN BERTHELOT, OF EAST TOLEDO, OHIO.

STAY-BOLT FOR BOILERS.

No. 910,361.  Specification of Letters Patent.  Patented Jan. 19, 1909.

Application filed February 4, 1907. Serial No. 355,539.

*To all whom it may concern:*

Be it known that I, JACKSON DENEAL, a citizen of the United States, residing at Toledo, in the county of Lucas and State of Ohio, have invented a new and useful Improvement in Stay-Bolts for Boilers, of which the following is a specification.

My invention relates to a stay bolt for boilers, and has for its object to provide a bolt of the kind, that is readily attached and detached, and that is adapted to form tight joints in the plates of the boiler without being riveted, and to be removed without destroying the threads of the plate.

I accomplish these objects by the construction and combination of parts hereinafter described and illustrated in the drawings, in which—

Figure 1 is a side view of a stay bolt constructed in accordance with my invention, partly in longitudinal section. Fig. 2 is a similar view of a modified form of my invention.

In the drawings A represents a stay bolt constructed in accordance with my invention, in which 1 is the tubular body portion having the exteriorly and interiorly threaded end portions 2, which are of increased diameter equal to twice the depth of the exterior threads.

3 represents a pair of head bolts, each having the exteriorly threaded body portion 4, of a diameter and thread adapting them to be run into the end portions of the body 1, and a head 5 squared for a wrench, and having the concentric flange 6 of increased diameter on the inner face of the head.

The body 1 is made of a length to extend through the boiler plates 7, which the bolt is designed to stay, with the ends flush with the outer faces of the plates, and the plates are tapped and interiorly threaded to receive the end portions 2. After the body 1 is in position in the plates 7, the head bolts are run into the end portions, with copper washers 8 between the head and the plates, against which the heads are tightened by a wrench until the washers are tightly compressed between the concentric flanges 6 of the heads and the plates, whereby the joints are secured against leaking.

Preferably the head bolts are each provided with a central reduced bore 9, whereby in the event of the bolt becoming broken by the pressure of the boiler, the fact of its being broken may be detected by the escaping steam or water.

In Fig. 2 is shown a modified form of stay bolt B, comprising a solid body bolt 10, and the sleeve head bolts 11 having the exteriorly and the interiorly threaded body portion 12, and the heads 13, squared for a wrench and provided with the concentric flanges 14 on their inner faces. The plates are tapped to receive the body portions 12 of the sleeve bolts, and the interiorly threaded bores of the sleeve bolts are of a diameter and thread to run on the body bolts 10 of the bolt B. The sleeve bolts are also provided with copper washers 8, and when the sleeve bolts are run on the body bolt 10 and into the plates until the washers are compressed tightly on the plates, the washers tighten and close the joints against leakage.

The bolts A may be attached by first running into one end a head bolt 3, until the head is tight against one end of the body of the bolt, and then threading the body of the bolt through both plates until the opposite end of the body bolt is flush with the outer side of the second plate and the washer 8 is compressed against the outer side of the first plate. The other head bolt 3 is then run into the opposite end of the body bolt, with a washer 8 between the end of the body bolt and the second plate, and, the two head bolts, being each held by a wrench, are tightened on the washers 8 until the joints at each end of the bolt are completely closed. The bolt A may be readily detached from the plates, by removing the head bolts 3 and inserting within the bore of the bolt a suitable tool for engaging the inner wall of the bolt body and running it out of the threads of the plates.

The bolt B may be attached to the plates by first running one of the head bolts 11, having a washer 8 thereon, on one end portion of the body 10, until the inner side of the head abuts the end of the bolt. The bolt is then inserted through one plate up to the head bolt, which is then run into the threads of the plate, until the washer 8 is tightly compressed against the plate. The other head bolt 10 with a washer 8 thereon is then run onto the opposite end of the body 10 and simultaneously into the threads of the opposite plate until the washer is compressed on the plate, the first head bolt, the while, being held against backward turning by a wrench. The bolt B is readily detached by running the sleeve head bolts out with a wrench, the last of the head bolts to be removed carrying with it the body bolt 10.

Stay bolts constructed as shown and described, avoid the necessity of forming rivet heads thereon, and the skilled labor required therefor, and the detachable heads and washers provide increased support for the plates.

What I claim to be new is—

A stay bolt for boilers, comprising a main body bolt of a length to extend through alined orifices of opposite boiler plates, and having its end portions threaded, an attachable and detachable head bolt for each end portion of the bolt body, each head bolt having a threaded body portion of a length to extend through the adjacent boiler plate, and adapted to threaded engagement with the threaded end portion of the main bolt body extending through the plate, and a head portion adapted to be engaged by a wrench, and to shoulder against the boiler plate through which its body portion extends, and a ductile metal washer on the body portion of each head bolt, adapted to be compressed between the head of the head bolt and the plate through which the head bolt extends, by running the head bolts into threaded engagement with the end portions of the main bolt body, substantially as set forth.

In witness whereof, I have hereunto signed my name in the presence of two subscribing witnesses, this 28th day of January, 1907.

JACKSON DENEAL.

In presence of—
WILLIAM J. McCULLUGH,
F. J. ESCHENBURG.